(12) United States Patent
Gallien

(10) Patent No.: US 9,554,390 B2
(45) Date of Patent: Jan. 24, 2017

(54) INTERFERENCE CONTROL IN SHARED BANDS

(71) Applicant: The Aerospace Corporation, El Segundo, CA (US)

(72) Inventor: Gary Lee Gallien, Fullerton, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/714,903

(22) Filed: May 18, 2015

(65) Prior Publication Data

US 2016/0345335 A1    Nov. 24, 2016

(51) Int. Cl.
| | |
|---|---|
| *H04W 72/08* | (2009.01) |
| *H04W 72/04* | (2009.01) |
| *H04W 52/24* | (2009.01) |
| *H04W 16/00* | (2009.01) |
| *H04B 1/00* | (2006.01) |
| *H04W 4/00* | (2009.01) |

(52) U.S. Cl.
CPC ......... *H04W 72/082* (2013.01); *H04W 52/243* (2013.01); *H04W 72/0453* (2013.01); *H04B 1/00* (2013.01); *H04W 4/00* (2013.01); *H04W 16/00* (2013.01)

(58) Field of Classification Search
None
See application file for complete search history.

(56) References Cited

U.S. PATENT DOCUMENTS

| | | | | |
|---|---|---|---|---|
| 5,548,809 | A * | 8/1996 | Lemson | H04B 7/0837 370/280 |
| 5,594,946 | A * | 1/1997 | Menich | H04W 16/10 455/522 |
| 5,822,699 | A * | 10/1998 | Kotzin | H04W 36/26 455/447 |
| 8,068,826 | B2 | 11/2011 | Kuffner et al. | |
| 8,155,033 | B2 | 4/2012 | Chaudhri et al. | |
| 8,265,684 | B2 | 9/2012 | Sawai | |
| 8,565,208 | B2 | 10/2013 | Shan et al. | |
| 8,892,113 | B2 | 11/2014 | Ratasuk et al. | |
| 8,942,701 | B2 | 1/2015 | Kasslin et al. | |
| 2004/0058712 | A1* | 3/2004 | Rudolf | H04B 7/022 455/562.1 |
| 2004/0100941 | A1* | 5/2004 | Lim | H04B 7/1858 370/349 |

(Continued)

*Primary Examiner* — Kodzovi Acolatse
(74) *Attorney, Agent, or Firm* — LeonardPatel PC

(57) ABSTRACT

Terrestrial mobile wireless network capacity may be maximized subject to an interference constraint imposed by a protected station of another wireless network in a shared band. Equipment of one or more users (UEs) may receive a calibrated beacon signal from the protected station prior to activating a transmitter of one or more wireless UEs. The one or more UEs may measure an isolation (path loss) value between the one or more UEs and protected station using the beacon signal, and dynamically adjust the transmit power of one or more wireless UEs to maintain aggregate interference received by the protected station below an "acceptable" value. The transmit power may be adjusted based on the measured isolation and based on the indicated receive activity, such that the wireless network may operate with no interference constraints imposed by the protected station when a non-active state is indicated.

32 Claims, 8 Drawing Sheets

(56) References Cited

U.S. PATENT DOCUMENTS

| | | | |
|---|---|---|---|
| 2007/0135051 A1* | 6/2007 | Zheng | H04B 7/18563 455/63.1 |
| 2008/0043863 A1* | 2/2008 | Ji | H04B 1/7075 375/260 |
| 2009/0163237 A1* | 6/2009 | Abedi | H04W 16/14 455/501 |
| 2010/0015967 A1* | 1/2010 | Perets | H04W 4/00 455/422.1 |
| 2010/0118841 A1* | 5/2010 | Kalhan | H04W 48/08 370/338 |

* cited by examiner

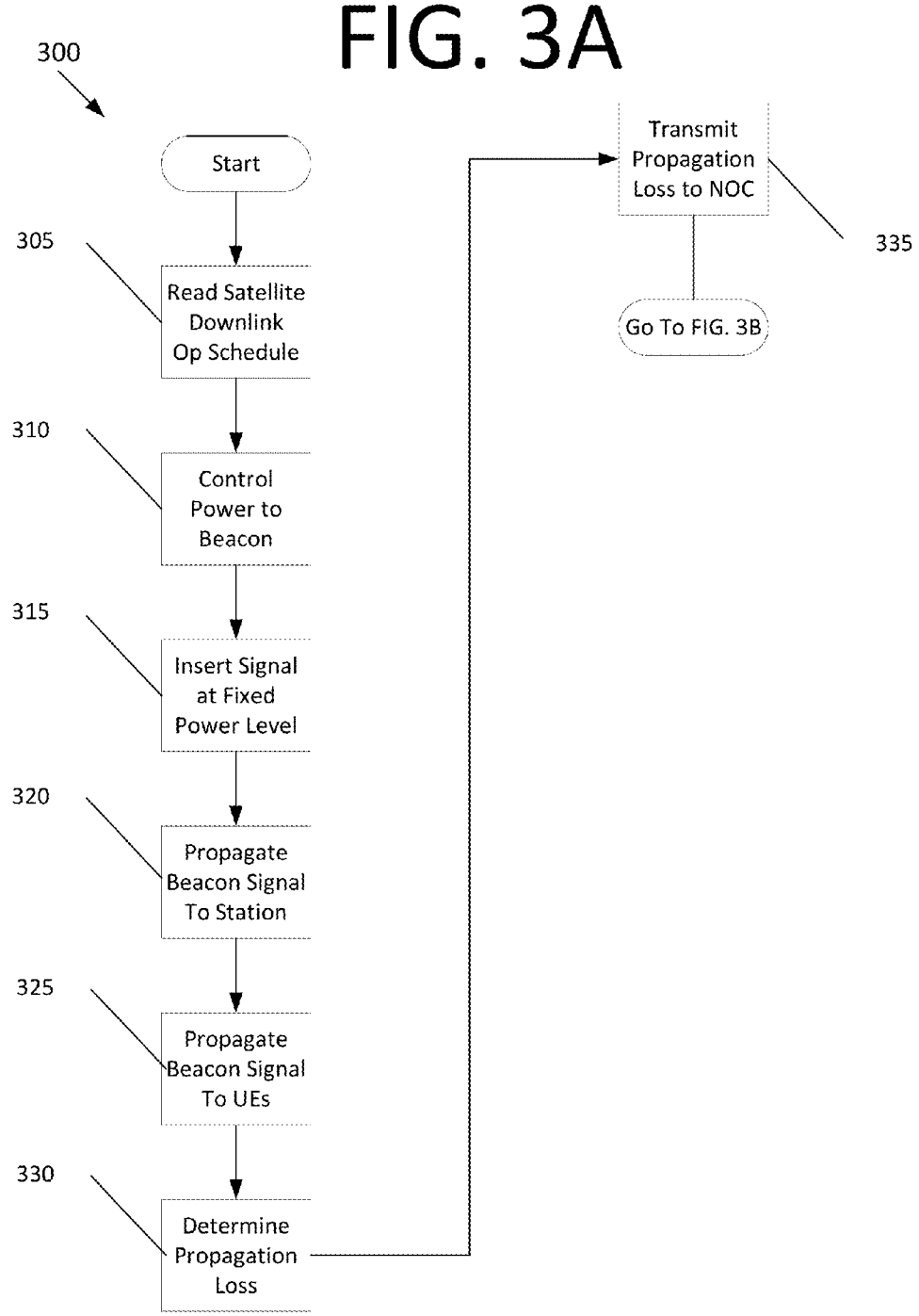

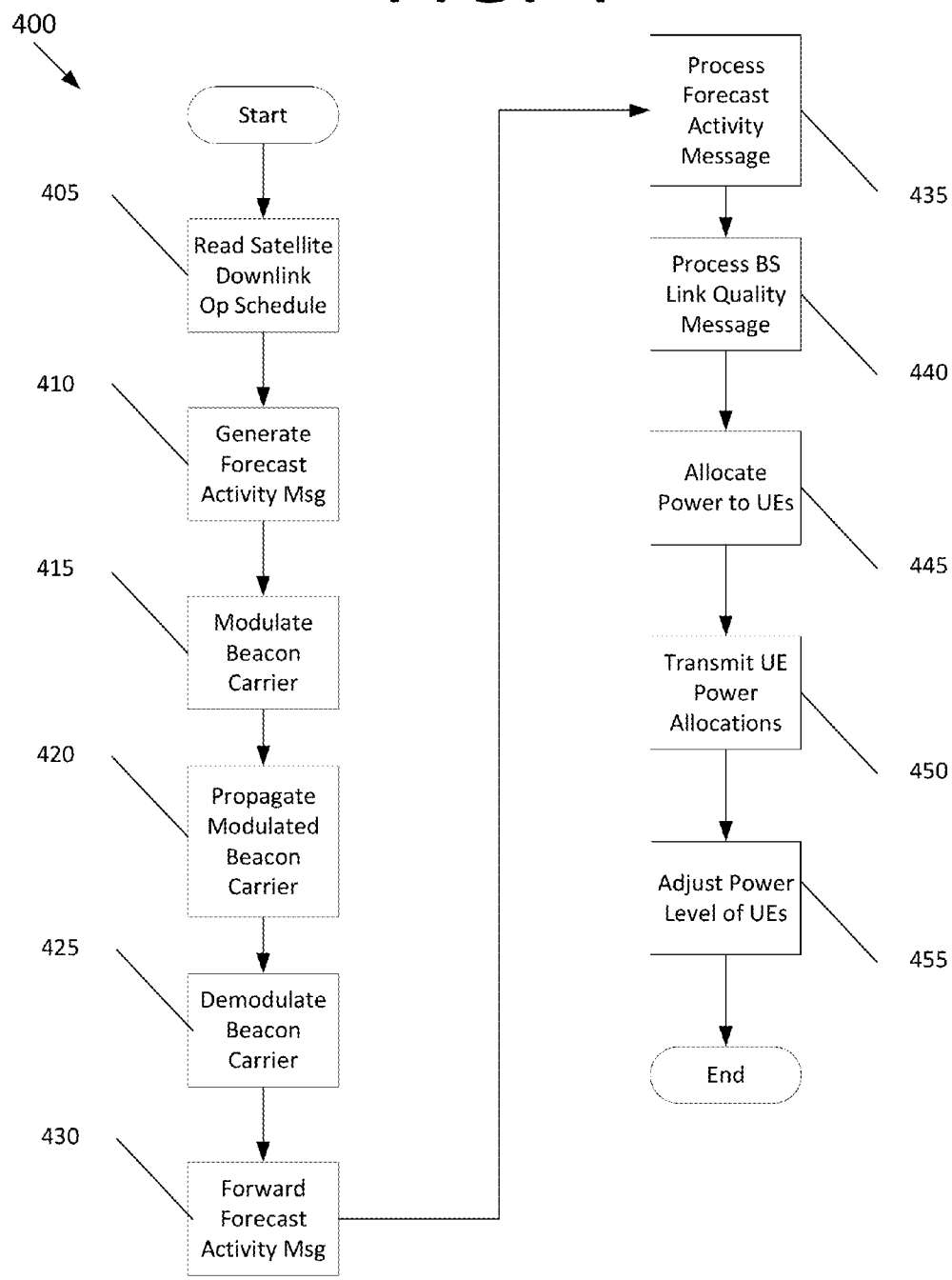

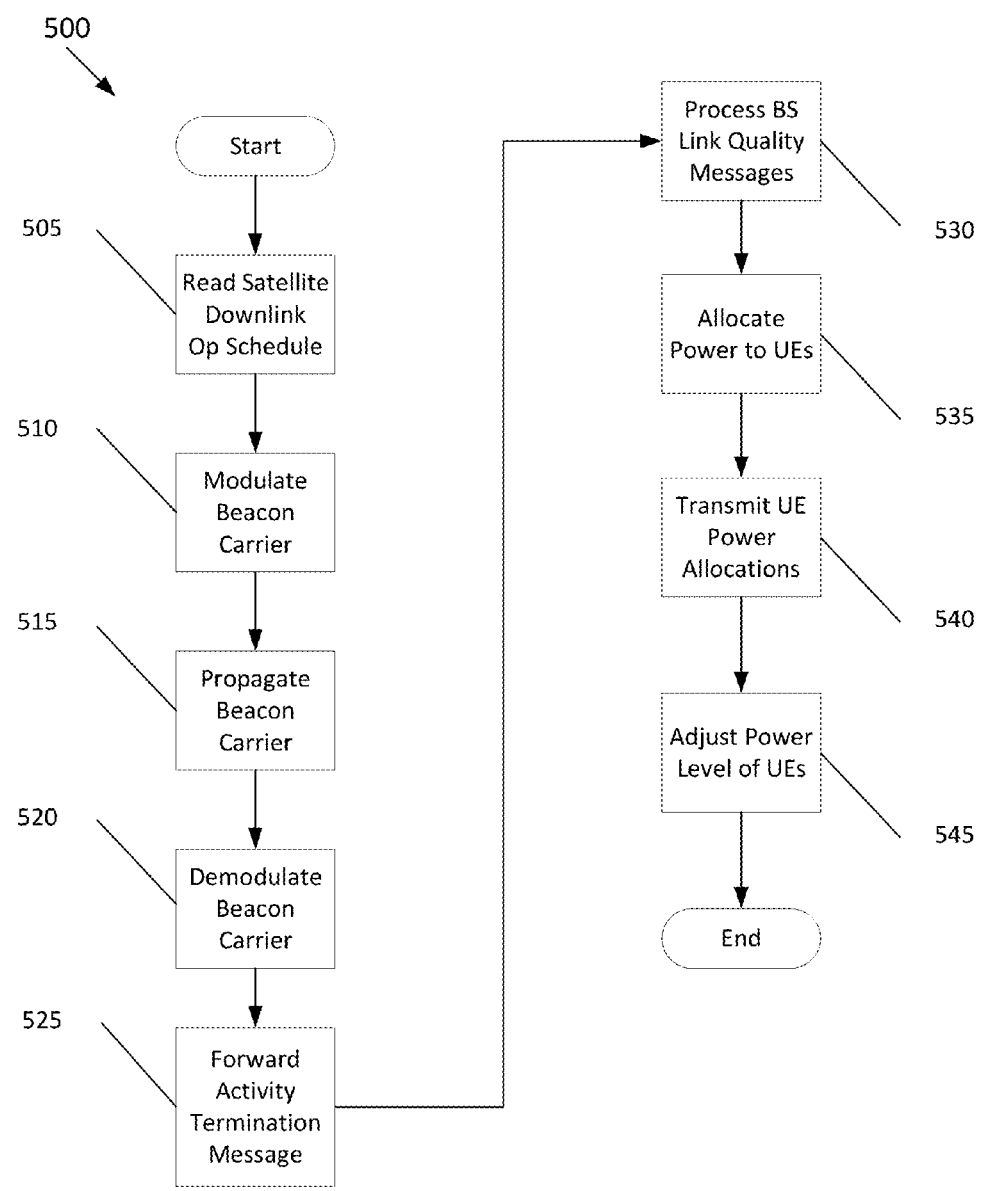

INTERFERENCE CONTROL IN SHARED BANDS

FIELD

The present invention generally pertains to interference control among wireless communications networks, and more specifically, to maximization of a secondary wireless network's capacity by opportunistic use of a spectrum of a primary wireless network.

BACKGROUND

As terrestrial and satellite communication traffic demand and loading increase, physical limits of channel capacity and isolation between channels are stressed. These physical limits constrain network capacity. Network capacity is proportional to channel capacity and the number of channels that can be supported or created in a geographic area. Channel capacity limits the amount of information that can flow over a channel. In all wireless communication networks, radiowave spreading causes interference that limits the utility of channels that can be shared in the same geographic area. As a result, the number of useable channels is constrained, and network capacity is limited.

A typical cellular wireless network connects one or more base stations (BSs) with a highly interconnected mesh network of landlines that distribute message traffic globally and exchange traffic with traditional "wired" telephones as well as Internet networks. Each BS extends this traffic connectivity to a cluster of users (i.e., user equipment (UE) for each user) in a geographically-limited "cell" using wireless radio communications technology. Each cell employs a "star" topology having a BS as the "hub" and radio connectivity to the UEs constituting the "spokes". All UEs within a cell share the same spectrum, a spectrum that is disjoint from the spectrum shared by UEs in adjacent cells to prevent adjacent cell interference. The size of the network (e.g., the number of users) and the geographic area coverage of the cells, together with the useable UE channel bandwidth and useable UE channel power, are contributors to network capacity. Deploying additional BSs in areas of high population density accommodates a larger number of cellular users, and as a result, revenue for the "carriers", i.e., the providers of the network, is increased. Licenses to operate cellular networks in highly populated areas are currently valued by the carriers at several dollars per MHz of spectrum for each potential customer occupying the network coverage area.

To minimize interference between wireless networks operating in the same geographic areas (e.g., AT&T®, Verizon®, etc. in some cities) frequency channelization is often employed to allow the different networks to use different frequencies. This work-around is limited by the available bandwidth under the allocation rules and the necessary bandwidth of the individual channels. When networks share bands, additional measures must generally be taken to maximize network capacity. For example, transmit power, as well as geographic separation between network transmitters and receivers, must be managed to provide sufficient isolation to avoid significant loss of capacity to one or both networks due to inter-system interference. Interference, as used herein, is measured in units of power, such as Watts (or as more commonly used among engineers, as 10 times the base-ten logarithm of that power). Isolation of two terminals at the ends of a wireless communication channel is defined herein as the ratio of power received to the power transmitted in the same spectrum. This ratio may be stated as a decimal fraction (or, as more commonly used by engineers, as 10 times the base-10 logarithm of that ratio). While geographic separation contributes to this isolation, obstacles along the radio propagation path and the antenna gains at each end of the channel are physical mechanisms that affect this ratio. In particular, while obstacles generally increase this ratio, antenna gain generally reduces the ratio. The portion of isolation that is due to losses along the radiowave path through the atmosphere is commonly referred to as propagation loss, which excludes antenna gain (or antenna loss) at each end of the channel. In the sequel, path loss and isolation (hereinafter "path loss/isolation") refer to the same ratio, and propagation losses are assumed to be accounted for as a component of path loss/isolation. UE path loss/isolation from BSs and other radiocommunication stations varies in time due to changes in the geometries of obstacles along the propagation path, as well as changes in the antenna gains resulting from changes in path direction in azimuth and elevation.

Within a single cellular network, interference between UEs sharing a band limits network capacity. For long term evolution (LTE) networks in particular, isolation/path losses between the UEs and the BSs are detected by the BSs, which make changes to UE transmit power allocations within milliseconds to ensure that the UEs can reliably communicate with their own BSs, to minimize inter-cell interference (i.e., with other BSs), and to maximize network capacity. The UE path loss/isolation determined by each BS is noted in periodic UE-to-BS channel quality indications (CQIs), which reflect the positive effect of UE transmit power and the negative effect of path loss between the UEs and the BSs upon the UE signal detectability (limited by the signal-to-noise ratio within the BS receiver).

Under some existing LTE allocation rules, the BS allocates just enough power to UEs to overcome UE-to-BS path loss/isolation (a minimum bound on UE power) in order to preserve battery life. BSs will also sometimes allocate more power to those UEs that have higher channel quality to maximize network capacity. When there are radiocommunication stations requiring legally-enforceable interference protection, the LTE allocation process may require expansion to reflect the additional constraint of "acceptable" aggregate interference. Aggregate interference is the sum of all UE-caused interference powers, measured at the protected station, typically stated in terms of Watts or Milliwatts. Satisfaction of this constraint may require modification of allocations affecting UE operations, i.e., applying upper bounds to UE transmit powers and possibly applying lower bounds to UE proximity to the protected station.

National spectrum management rules require a wireless carrier to obtain a Federal Communication Commission (FCC) license before transmitting on specific frequencies in specific locales currently occupied by National Oceanic and Atmospheric Administration (NOAA) Earth stations, such as Wallops Island, Va., Suitland, Md., Sioux Falls, S. Dak., etc. The path loss/isolation of channels in the licensed area is critical to the total network capacity, and channel isolation becomes problematic when dissimilar services occupy the same geographic area, particularly when one of the services requires a high degree of interference protection.

As a consequence of the recent conclusion of FCC spectrum Auction 97, the FCC is scheduled to issue wireless licenses in bands and geographic areas that were unavailable before and were previously assigned to different services (e.g., satellite services). However, these bands and areas, which have been auctioned, will continue to be used by federal satellite systems, e.g., a U.S. meteorological satellite system operating in the 1695-1710 MHz band whose missions are critical and must be protected from interference from mobile wireless licensees.

The meteorological satellite system includes downlinks to protected radio communications stations, such as an Earth station, a ground station, etc., that are extremely sensitive, i.e., have a very low noise temperature necessary to detect and demodulate a wide-band signal from a small transmitter located in a satellite thousands of miles away. Mobile wireless interference may cause disruption in Earth station downlink signal processing, and cause the loss of downlink information collected by the satellite, impacting critical missions. A receiver at the Earth station may receive an unacceptable level of interference when the UE is approximately 100 kilometers away and when the UE is high enough in altitude (e.g., on a mountain top) to have a clear line of sight to the Earth station. However, due to the terrain between the UE and the Earth station, a direct line of sight may be prevented, and the interference may be significantly reduced. The path loss/isolation thus isolates UEs from the Earth station. This path loss/isolation at any one UE varies with time, by as much as a factor of 10 within a few seconds, affecting the UE interference at the Earth station. When the path loss/isolation is temporarily high, there is an opportunity for some UEs to operate in the vicinity of those Earth stations and at higher power, both of which could contribute to network capacity. Wireless network technology is moving toward exploiting these opportunities to temporarily increase network capacity.

An important advancement in this direction has been the planning for multi-band networks that allow UEs to switch between disparate spectral bands on an opportunistic basis. This strategy capitalizes on the likelihood that at least one of the alternate bands is capable of supporting the UE links at any time (a likelihood that is higher than that in either band, individually). Thus, given the necessity of sharing spectrum and meeting an additional allocation constraint, i.e., aggregate interference received by a protected station, the opportunities for network capacity are increased by multi-band operation.

Current wireless networks employ network optimization software that exercises dynamic UE power control to maximize network capacity. However, these wireless networks are not presently configured to employ in situ measurements of path loss/isolation between all UEs and the Earth station in near-real-time. Consequently, near-real-time path loss/isolation information is not utilized by current wireless networks to allocate UE power to address the scenario above.

Since the Earth station antenna is generally located on the order of 10 meters above the ground, the Earth station typically has a horizon on the order of 10 kilometers. As such, radiation from an interfering UE at distances of 10 kilometers or beyond is often significantly reduced by the interaction with the terrain. This provides some needed isolation between UEs and the Earth station, reducing the received interference power.

When wireless carriers seek licenses for federal bands near NOAA Earth stations, the wireless carriers are subject to prohibition from causing interference exceeding a level acceptable to the incumbent NOAA Earth station, for example. The FCC has adopted a strategy in authorizing wireless licenses that requires a "coordination zone" to be established by network carriers and NOAA outside of which a UE may transmit without specific authorization by NOAA. The coordination zone thus inhibits the UE from transmitting within a specific circle, centered on the Earth station. For example, UEs licensed for the market area surrounding Sioux Falls, S. Dak. may not operate when the UEs are within about 40 kilometers of the Earth station without prior coordination with the Earth station operator. This strategy would be problematic if instituted for several reasons.

First, for the time being, the process for zone radius calculation is based on median values of UE path loss/isolation predicted by a government-approved theoretical model. This means that the "acceptable" level of aggregate interference might be exceeded half the time. Second, excursions of the actual path loss/isolation up to 10 dB from the theoretical median value are to be expected, resulting in large violations of the "acceptable" level of UE interference received by the Earth station, even when the UEs operate well outside of the coordination zone. Third, the theoretical model predictions depend on path loss/isolation measurements made in locations far removed from the sites in question, resulting in significant prediction departures from actual values of path loss/isolation. Lastly, by relying on fixed-values of theoretical path loss/isolation rather than actual path loss/isolation, there are additional network capacity opportunities that are foreclosed by this process. Studies show that the same theoretical model of interference predicts that the UEs might operate as close as 15 km from the Sioux Falls NOAA Earth station at least 50% of the time if the variations in path loss/isolation were exploited, even if the Earth station were receiving downlinks 100% of the time.

In summary, significant opportunistic network capacity exists inside the current coordination zones about the primary protected stations. However, conventional systems cannot realize this capacity because conventional systems fail to detect the temporary high path loss/isolation values that exist.

Depending on the location of the population with respect to the Earth station, there may be conflict between business interests of the wireless carrier operating under, or seeking, a license and the interests of the incumbent operator (e.g., the federal government in the case of the NOAA). For example, the federal government may decide on the specific protection zone, and the zone may include a very populated area, inhibiting the wireless carriers from using the band in an area capable of producing significant revenue for the wireless carrier. The net result is that very lucrative wireless network support of a large number of customers cannot be accommodated inside the protection zones because the wireless networks are not endowed with the ability to act on the opportunity to serve those customers in near-real-time.

When wireless carriers determine whether they should operate or seek a license to operate in the protected user's band, the wireless carriers make assumptions on how much path loss/isolation exists between the operational UE locations and the protected station. Path loss/isolation is highly dependent on the shape of the intervening terrain, and to a lesser extent, the weather. For example, at separation distances of less than 100 kilometers, variation in the path loss/isolation of 5 dB or more may occur over a year's time due to weather and seasonal changes, and short term variations in the path loss/isolation of 5 dB or more can be anticipated as a consequence of rapid movement of the UE over the terrain (e.g., in automobiles on a high speed highway).

In addressing the concerns about wireless network interference to NOAA Earth stations, NOAA investigated monitoring interference inside the Earth station as a method of protection. In this method, when the interference becomes close enough to the "acceptable" level that a violation can be considered likely, the Earth station would send a message to the wireless carrier to reduce the power on the UEs contributing to the (potential) violation of the "acceptable" interference level. This method is problematic for several reasons. First, due to the dynamic variation in path loss/isolation, the Earth station would generally not be able to reliably predict the violation until it was about to occur, leaving too little time for corrective action by the wireless network to prevent the violation. Second, in an attempt to increase the likelihood of prevention, the Earth station may lower its "alarm" threshold, causing an (unavoidable) increase in the false alarm rate, potentially leading the wireless network to incur costs and possibly resist the government's attempts to protect the Earth station by this approach. Third, without accurate UE-to-protected station path loss/isolation information, the wireless network cannot accurately determine which UEs should reduce power and how much reduction would be required to meet the "acceptable" level of aggregate interference. These are fundamental limitations of monitoring as a way to avoid unacceptable interference in a shared band, which lead to large losses of network capacity.

Thus, an alternative approach may be beneficial to prevent UE violation of the "acceptable" interference level of a protected radiocommunication system in a shared band, while permitting the maximum possible opportunistic network capacity attained from less restrictive UE deployment and higher limits on UE transmit power.

SUMMARY

Certain embodiments of the present invention may be implemented and provide solutions to the problems and needs in the art that have not yet been fully solved by conventional interference control approaches and systems. For example, some embodiments of the present invention enable control of interference in a shared band to prevent a violation of an "acceptable" aggregate interference level from occurring. UE-to-protected station path loss/isolation estimates, based upon measurements, may be performed in near-real-time, enabling the largest possible wireless network capacity (i.e., maximum wireless network coverage area and maximum transmission power) with minimal risk of degradation to the service of the protected radio communications station (e.g., the incumbent Earth station downlink).

In one embodiment, a process includes estimating, by user equipment of a secondary wireless network, a path loss/isolation between the user equipment and a protected station, prior to activating the user equipment in the shared band based on a power measurement of a calibrated beacon signal received from the protected station holding primary status. The process also includes adjusting power, by the user equipment, to control aggregate interference with the protected station in the shared band, while maximizing an opportunistic network capacity of the secondary wireless network.

In another embodiment, an apparatus includes at least one processor and memory having a set of instructions. The set of instructions with the at least one processor are configured to cause the apparatus to estimate a path loss/isolation between the apparatus and a protected station, prior to activating the apparatus of a secondary wireless network in a shared band based on a power measurement of a calibrated beacon signal. The calibrated beacon signal is received from the protected station holding primary status. The set of instructions with the at least one processor are further configured to cause the apparatus to adjust power of the apparatus to control aggregate interference with the protected station in the shared band, while maximizing an opportunistic network capacity of the secondary wireless network In yet another embodiment, a process includes receiving, by a network operations center, an activity message of a protected station operating in a shared band with user equipment of a secondary wireless network. The process also includes allocating, by the network operations center, a power for the user equipment based on the activity message of the protected station. The process further includes communicating, by the network operations center, the allocated power to the user equipment to control aggregate interference with the protected station in the shared band, while maximizing an opportunistic network capacity of the secondary wireless network.

In still another embodiment, a system includes a protected station that is configured to transmit a calibrated beacon signal to user equipment of a secondary wireless network. The user equipment is configured to estimate the path loss/isolation between the user equipment and the protected station using a power measurement of the calibrated beacon signal. The user equipment is further configured to adjust power of the user equipment to control aggregate interference with the protected station in a shared band, while maximizing an opportunistic network capacity of the secondary wireless network.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 3A and 3B are flow diagrams illustrating a process for measuring path loss/isolation, and for dynamically adjusting a power of one or more UEs in a shared band, according to an embodiment of the present invention.

FIG. 4 is a flow diagram illustrating a process for scheduling operation times for one or more UEs in a shared band and for dynamically adjusting a power of one or more UEs in the shared band, according to an embodiment of the present invention.

FIG. 5 is a flow diagram illustrating a process for adjusting a power for one or more UEs in a shared band, according to an embodiment of the present invention.

DETAILED DESCRIPTION OF THE EMBODIMENTS

Figure 1:
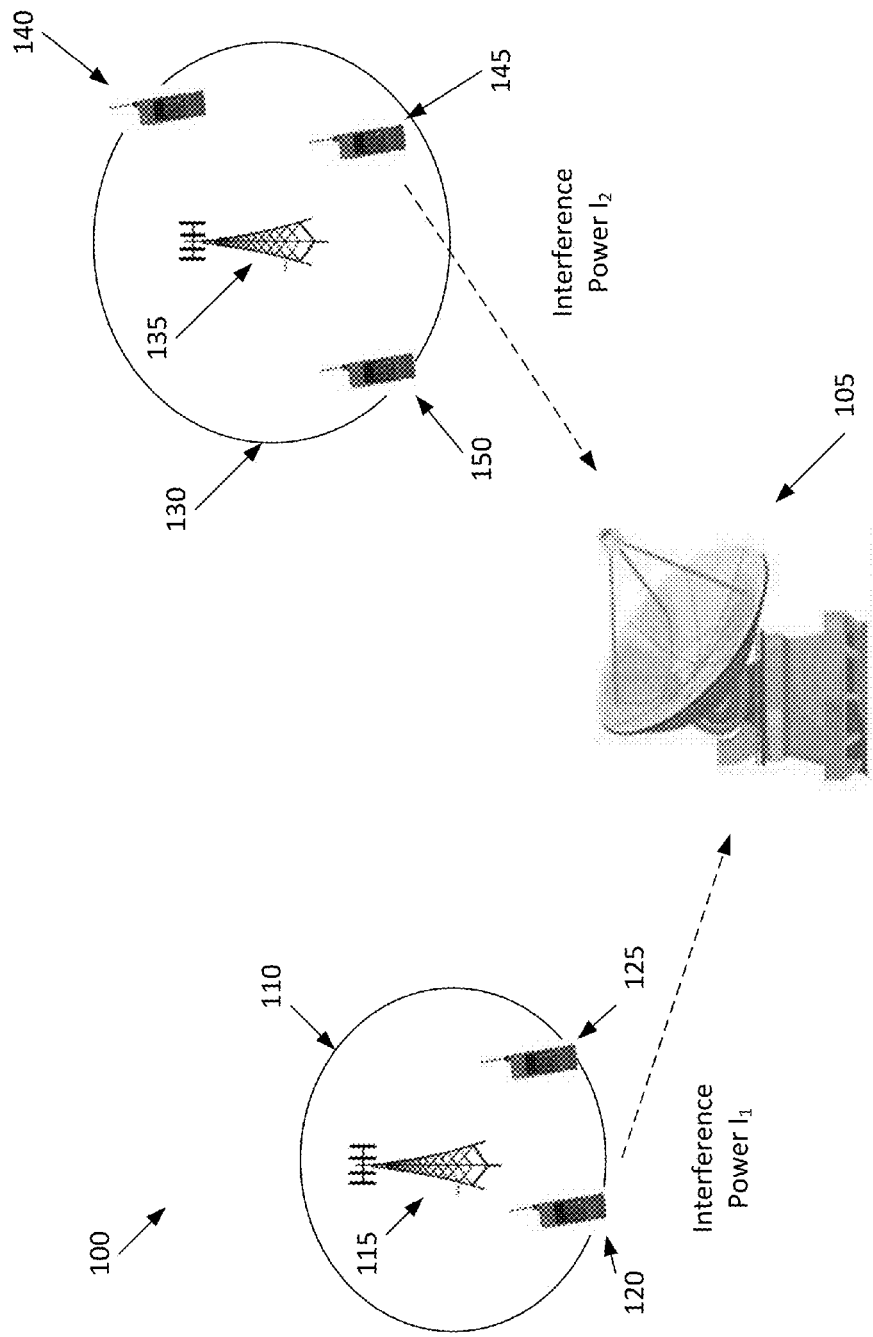
FIG. 1 is an architectural diagram illustrating wireless network interference to a protected Earth station.

In light of the problems discussed above, it may be beneficial to determine in advance where UEs can operate and at what power the UEs can transmit to avoid violating an agreed "acceptable" level of aggregate interference at the Earth station. Simply stated, it may be beneficial to implement a process to predict and avert violations of "acceptable" levels of aggregate interference in a shared band.

Some embodiments of the present invention pertain to interference control in shared bands. For instance, a cognitive function for wireless networks may be implemented to regulate UE transmitted power, maximizing wireless network capacity, while preventing the violation of an "acceptable" aggregate interference level, i.e., preserving the quality of an incumbent Earth station's downlink. In some embodiments, the Earth station may include a calibrated transmitter beacon (the "beacon") that operates in an uplink RF chain of the Earth station. The beacon may operate in a band close to the downlink spectrum, but isolated via filtering, with out-of-band rejection sufficient to hide the beacon signal from the downlink signal processor of the Earth station.

The power of the beacon may be sufficient to deliver an adequate signal-to-noise value for reliable detection and/or demodulation to all UEs close enough to cause significant interference. The beacon power should be prevented from causing interference to exceed the "acceptable" level in the receiver of the Earth station. In general, the beacon signal path loss/isolation from the Earth station to the UE has almost the same path loss/isolation as the UE signal path loss/isolation to the Earth station, i.e., the loss difference due to frequency difference is small. The received signal power may be subtracted from a known value of a beacon transmit power to obtain an estimate of the path loss/isolation between the UE and the Earth station in the shared band. In certain embodiments, predefined correction factors may be added to account for dispersion errors when necessary. This estimate can be digitized and transmitted in real-time to a BS via a supervisory channel on the normal UE transmission link.

In some embodiments, the BS may include a processor configured to identify one or more UEs experiencing low path values corresponding to high values of interference received by the Earth station. The BS may perform downward adjustments in transmit power limits allocated among those UEs to prevent violation of the Earth station "acceptable" level of aggregate interference. In other embodiments, the BS may transfer the estimated path loss/isolation for each UE to a Network Operations Center (NOC) to enable the NOC to allocate the power limits of the UEs. In such an embodiment, the NOC may transmit the allocated power limits of the UEs to each BS. The BSs may implement the allocated power limits by instructing the UEs to use the allocated powers. This allows the UEs to adjust the individual power limits to meet an aggregate received interference power limitation imposed by the NOC. In some embodiments, when the available path loss/isolation is very dynamic and control latency is critical, the BS may perform the reallocations rather than the NOC.

It should be appreciated that UE path loss/isolation from the Earth station may be very dynamic when the UE is moving at high speeds over a rough topography. It should also be appreciated that in some embodiments, the BS can perform the UE power allocation, and the UE can perform the UE power adjustments, more quickly than the NOC. One reason for this is that the NOC suffers allocation delays due to communication delays between the BS and the NOC. When available UE path loss/isolation varies faster than the UE power allocation/adjustment process that follows the path loss/isolation measurement process, errors in the allocation and adjustment process can occur, increasing the risk of violation of agreed aggregate interference levels that could be avoided by under-allocation but only at the expense of network capacity. When the difference between minimum UE power for BS link closure and the allocable power for interference control is small, the control latency is critical to avert those violations and losses in network capacity. When the UEs under control of a particular BS constitute the principal contributors to the aggregate interference at the Earth station, the BS may timely and accurately allocate UE power, and the UEs may timely and accurately adjust the UEs' power to avert violation of the agreed levels of aggregate interference and minimize network capacity loss attributable to errors in path loss/isolation estimation.

Some or all of these UE power limitations may be used in a network optimization process, in which the UE power allocations are made to maximize network capacity, e.g., allocation algorithms that reflect an upper bound on aggregate interference based on measurements of path loss/isolation in a "beacon band" of frequencies.

It may also be beneficial for a wireless network to know when the shared band is in use by the Earth station. When the Earth station is not receiving in a shared band, a wireless network can operate without constraints on power or proximity imposed by the presence of the Earth station. For example, Earth stations may use downlinks 10 to 20 percent of the time. This potentially allows wireless networks to share the downlink spectrum 80 to 90 percent of the time. In those instances, when the wireless networks are aware of the inactive receiver status of the Earth station, the wireless network capacity could temporarily be restored to the same level as if the Earth station did not exist. For example, a process may include transmitting from the Earth station an operation status message to the wireless network or UEs. The operation status message may notify the wireless network or UEs that the Earth station is active or will be active in accordance with a forecast schedule.

FIG. 1 is an architectural diagram illustrating wireless network interference to a protected Earth station. In this embodiment, interfering signals from UEs 120, 125 that are conveyed to Earth station 105 are represented by a single dashed arrow labeled $I_1$, and interfering signals from UEs 145, 150 that are conveyed to Earth station 105 are represented by a single dashed arrow labeled $I_2$. In FIG. 1, an Earth station 105 may communicate with a downlink satellite (not shown). Operating relatively proximate to Earth station 105 are UEs 120, 125 and UEs 140, 145, 150. UEs operate near BSs 115, 135 in cells 110, 140. If UEs 120, 125 and UEs 140, 145, 150 are operating near Earth Station 105 and are operating on the same frequency band, Earth Station 105 may receive interference powers $I_1$ and $I_2$, representing the aggregate of interference from cells 110 and 140 (respectively) of a cellular network. This interference may cause disruption in downlink signal processing, and cause the loss of downlink information collected by the satellite, impacting a critical mission, for example.

Figure 2:
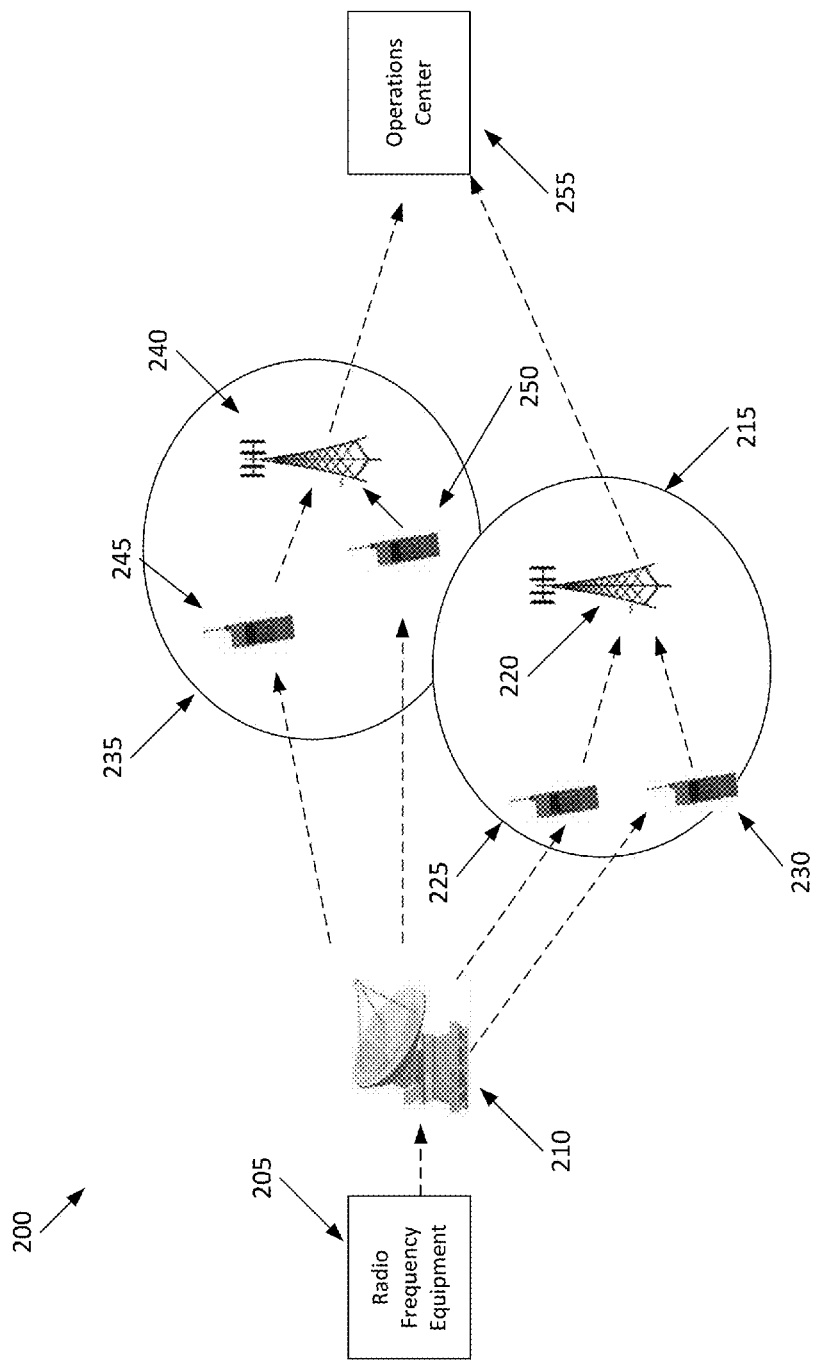
FIG. 2 illustrates a wireless network system for distributing information regarding path loss/isolation between one or more UEs and the Earth station, according to an embodiment of the present invention.

FIG. 2 illustrates a wireless network system 200 configured to distribute information about path loss/isolation between UEs 225, 230, 245, 250 and Earth station 210, according to an embodiment of the present invention. In this embodiment, prior to UEs 225, 230, 245, 250 operating on the same frequency band as Earth station 210, radio frequency equipment 205 may transmit a signal to Earth station 210 on a continuous basis while receiving and processing the satellite downlink signal. In this embodiment, Earth station 210 may include an antenna (not shown), and a beacon may be located within the antenna. The beacon, e.g., a pass-through device, may be installed in a RF transmit section (not shown) of Earth station 210. The pass-through device may be a directional coupler (not shown) configured to introduce the signal generated by radio frequency equipment 205 into an Earth station antenna. The signal power is a predefined and calibrated value. The predefined power (or the beacon power) may be as high as 40 dBm in some embodiments, e.g., in the case of Sioux Falls. This allows the signal to meet detectability requirements at all UEs that contribute significant interference power to the aggregate power at or above levels "acceptable" to Earth station 210. For example, in the case of the Sioux Falls NOAA Earth Station, the "acceptable" value may be −122 dBm. The calculated value of required beacon power may depend upon the planned UE deployment, which can be coordinated with the Earth station operator.

The beacon signal may propagate through Earth station 210 and out to UEs 225, 230 of cell 215 and UEs 245, 250 of cell 235. UEs 225, 230 and UEs 245, 250 may receive the beacon signal in a special channel. The special channel is separated by an amount that is needed to achieve the necessary path loss/isolation of the beacon signal from the Earth station downlink signal. In some embodiments, the special channel may be separate from the contested or shared band, and in particular, may be separate from the frequency band the UE operates on, as well as the frequency band of the Earth station downlink signal. The required isolation may be as high as 130 dB in some embodiments to avoid interference in excess of the "acceptable" level. The "acceptable" level is based on the signal-to-interference-plus-noise ratio required for reliable detection and demodulation of the downlink signal. The frequency offset may incur an error in the estimated path loss/isolation due to the dispersive nature of the propagation factors for which allowances may be made in the interpretation of the statistical deviation from calculated path loss/isolation values. UEs 225, 230 and UEs 245, 250 may include an additional receiver (not shown) for receiving the beacon signal in some embodiments. In other embodiments, UEs 225, 230 and UEs 245, 250 may receive the beacon signal on a standard receiver or transceiver. Using the beacon signal, UEs 225, 230 and UEs 245, 250 may measure the path loss/isolation, using the following equation $$\text{Path loss/Isolation (dB)} = \text{Received Beacon Signal (dBm)} - P(\text{dBm}) \quad (1)$$

where P(dBm) represents the power of the beacon signal, and the power expressed in dBm equals ten times the 10-base logarithm of the power in milliwatts, while the loss expressed in dB equals ten times the 10-base logarithm of the ratio of the received beacon signal to the transmitted beacon signal in milliwatts.

The propagation loss determined by each UE 235, 230 and UE 245, 250 is reported to BS 220 and BS 240, respectively. In a further embodiment, the BS 220 and BS 240 may forward the path loss/isolation of each UE 235, 230 and UE 245, 250 to cellular NOC 255. In some embodiments, BS 220 and BS 240 may include a unique receiver and/or transmitter for receiving and transmitting the path loss/isolation information. In other embodiments, existing backhaul and supervisory channels may be utilized.

Using the path loss/isolation, NOC 255 may allocate power to BSs 220, 240 and to UEs 225, 230 and UEs 245, 250 to avoid potential interference with Earth station 210. In another embodiment, BS 220, 240 may use the path loss/isolation information to allocate power of UEs 230, 225 and UEs 245, 250. It should also be appreciated that the greatest power adjustments may be made to those UEs, which are closer the Earth station 210 and may cause the most interference.

Furthermore, wireless mobile UEs are typically designed to have power control over at least a 40 dB range. Thus, when maximum power is not required, the UEs in this embodiment may reduce power to $1/100{,}000^{th}$ of a watt and operate without any issues.

Figure 3B:
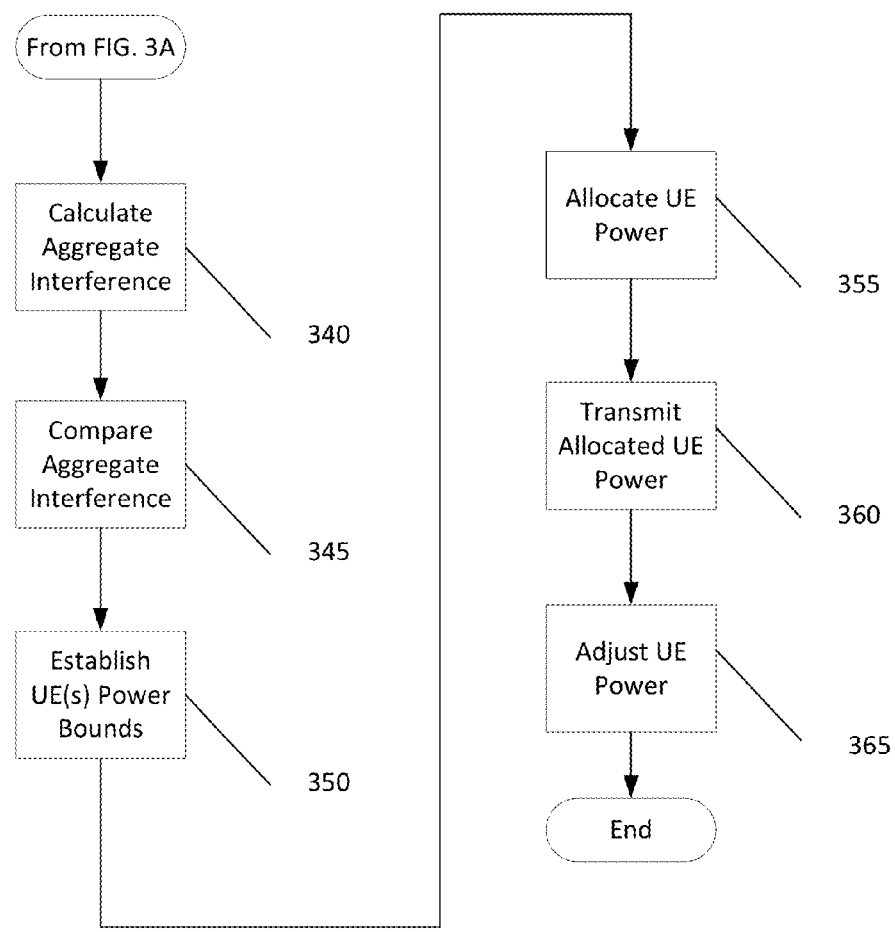

FIGS. 3A and 3B are flow diagrams 300 illustrating a process for measuring path loss/isolation, and for dynamically adjusting a power of one or more UEs in a shared band, according to an embodiment of the present invention. In this embodiment, the process includes an Earth station reading a satellite downlink operation schedule and supplying regulated power to a beacon integrated within the antenna of the Earth station at 305. A beacon device, e.g. a directional coupler and voltage-controlled amplifier, inserts at 315 a signal into a RF device of the antenna at a fixed power, and periodically calibrates the signal to be within a fraction of a decibel. The beacon signal propagates through the Earth station at 320, and is then propagated to one or more UEs at 325. In this embodiment, the one or more UEs share a portion of the same band as the Earth station downlink, while the beacon band is separate from the shared band. The one or more UEs at 330 determine the path loss/isolation (or estimated path loss/isolation) in the shared band using the beacon as a "standard candle".

In some embodiments, the path loss/isolation is given by the following equation $$\text{Path loss/Isolation (dB)} = \text{Received Beacon Signal (dBm)} - P(\text{dBm}) \quad (2)$$

where P(dBm) is the calibrated power output of the beacon signal in decibels above a milliwatt, and the power expressed in dBm equals ten times the 10-base logarithm of the power in milliwatts, while the loss expressed in dB equals ten times the 10-base logarithm of the ratio of the received beacon signal to the transmitted beacon signal in milliwatts.

After determining the path loss/isolation, the one or more UEs transmit the path loss/isolation data via their respective BSs to the NOC at 335. In this embodiment, the NOC calculates an aggregate interference received at the Earth station at 340. For example, the NOC calculates the individual user interference power received at the Earth station, replicates the calculated interference power for the one or more UEs, and adds the interference power of the one or more UEs to determine the aggregate interference. At 345, the NOC may compare the aggregate interference with the allowable interference, and at 350, may process the CQI message for the one or more UEs received to establish minimum and maximum bounds on power allocable to the one or more UEs. At 355, UE power is allocated to reflect the resolution of conflicting power requirements, and at 360, the allocations of UE power are transmitted to the one or more BSs. At 365, the one or more BSs may instruct the one or more UEs to adjust the UE power using the power allocation, thus controlling interference with the Earth station and maximizing network capacity. The process may be performed in some embodiments just prior to UE transmissions for those UEs contributing significantly to the aggregate interference received by the Earth station. It should be appreciated that in some embodiments the one or more BSs may perform a similar power allocation process instead of the NOC.

FIG. 4 is a flow diagram 400 illustrating a process for scheduling operation times for one or more UEs in a shared band and for dynamically adjusting a power of the one or more UEs in the shared band, according to an embodiment of the present invention. In this embodiment, the process includes an Earth station at 405 reading a satellite downlink operation schedule, i.e., receive start and stop times of the satellite downlink, and at 410, generating an activity forecast message, i.e., the start and stop times of the satellite downlink. At 415, the Earth station modulates a beacon carrier with the activity forecast message, and at 420, propagates or broadcasts the modulated beacon carrier to one or more UEs of a wireless network. In this embodiment, a beacon antenna may be located either at the Earth station antenna or at another antenna that provides omni-azimuthal coverage to ensure signal availability for the one or more UEs. The beacon output power in this embodiment is sufficient to deliver the activity forecast message with a signal-to-noise power ratio that is adequate for detection and demodulation. The one or more UEs at 425 may demodulate the beacon carrier to recover the forecast activity message, and at 430, forward the forecast activity message to their respective BS(s) and/or NOCs for use in reallocation of UE powers at times for which the Earth station receiver is inactive. It should be appreciated that the one or more UEs may include a dedicated receiver and/or transmitter receiving and transmitting messages. A similar configuration may be applied to the BSs.

At 435, the one or more BSs and/or NOC may process the forecast activity message and revise emission constraints for one or more UEs. At 440, the one or more BSs and/or NOC may process all BS CQI messages and allocate power for the one or more UEs. At 445, the BSs or NOC may allocate power to one or more UEs based on the satellite downlink operation schedule, e.g., reduce the power level to an "acceptable" level, switch the band, or increase power. At 450, in embodiments where the NOC allocates power, the NOC transmits the power allocations to the one or more BSs, and at 455, the BS instructs the one or more UEs to adjust their power levels accordingly.

In this embodiment, when the Earth station receiver is scheduled to be inactive, the UE power may be maintained or increased to the levels attainable as though the Earth station did not exist. The reallocation process also takes advantage of the duration of the forecast. This enables the use of a more comprehensive assessment of opportunistic network capacity than would otherwise be possible. This also potentially enables a more optimum reallocation of power, increasing the network capacity.

FIG. 5 is a flow diagram 500 illustrating a process for adjusting a power for one or more UEs in a shared band, according to an embodiment of the present invention. In this embodiment, the process includes an Earth station receiving at 505 a satellite downlink operation schedule to be broadcast to one or more UEs of a wireless network via a beacon. The satellite downlink operation schedule may include an activity termination message. In some embodiments, the beacon antenna may be an antenna of the Earth station or another antenna that provides omni-azimuthal coverage to ensure signal availability to one or more UEs. The beacon output power in this embodiment is sufficient to deliver the status message to the one or more UEs. At 510, a beacon carrier is modulated with the activity termination message, and at 515, is propagated via the antenna to one or more UEs. The one or more UEs in some embodiments may include a transmitter that shares a portion of the same band as the Earth station downlink. At 520, the one or more UEs demodulate the beacon signal containing the activity termination message in a special ("beacon") receiver, and at 525, the one or more UEs forward the activity termination message to its respective BS and/or NOC. At 530, the one or more BSs and/or NOC may process the BS link quality message, and at 535, the one or more BSs and/or NOC may use the activity termination message for reallocation of power of the one or more UEs at times during which the Earth station receiver is inactive. At 540, the UE power allocation may be transmitted to the one or more UEs, and at 545, the one or more UEs may adjust their respective power accordingly.

Stated differently, the process shown in FIG. 5 allows UE power to be maintained or increased to the levels attainable as though the Earth station did not exist when the Earth station receiver is inactive. For instance, the NOC may allocate higher power to one or more UEs when the Earth station receiver is inactive, increasing network capacity. The process may be performed in some embodiments just prior to adjusting UE radiating power for the one or more UEs contributing to the aggregate interference received by the Earth station.

The processes shown in FIGS. 3-5 may be performed, in part, by computer programs, encoding instructions for a nonlinear adaptive processor to cause at least the processes described in FIGS. 3-5 to be performed by the apparatuses discussed herein. The computer programs may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 3-5, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 6:
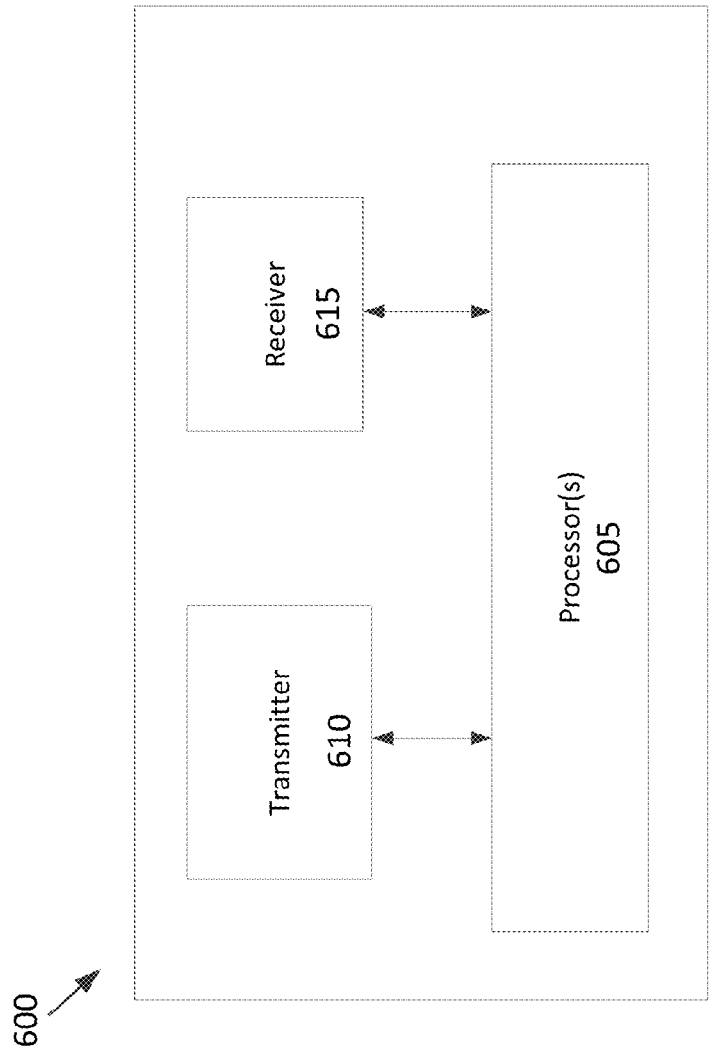
FIG. 6 is a block diagram illustrating a computing system for a UE according to an embodiment of the present invention.

FIG. 6 is a block diagram illustrating a computing system 600 for a UE, according to an embodiment of the present invention. In this embodiment, computing system 600 includes processor(s) 605, a transmitter 610 for transmitting data, and a receiver 615 for receiving data or signals. In wireless networks, these capabilities may exist. However, the receiver in wireless networks is tuned to the BS transmit frequency, which would not be suitable for use with a beacon signal due to mutual interference with BS downlinks to UEs. In some embodiments, the UE may be equipped with a specialized receiver that provides beacon reception on frequencies other than the BS transmit frequency and Earth station downlink frequency.

Figure 7:
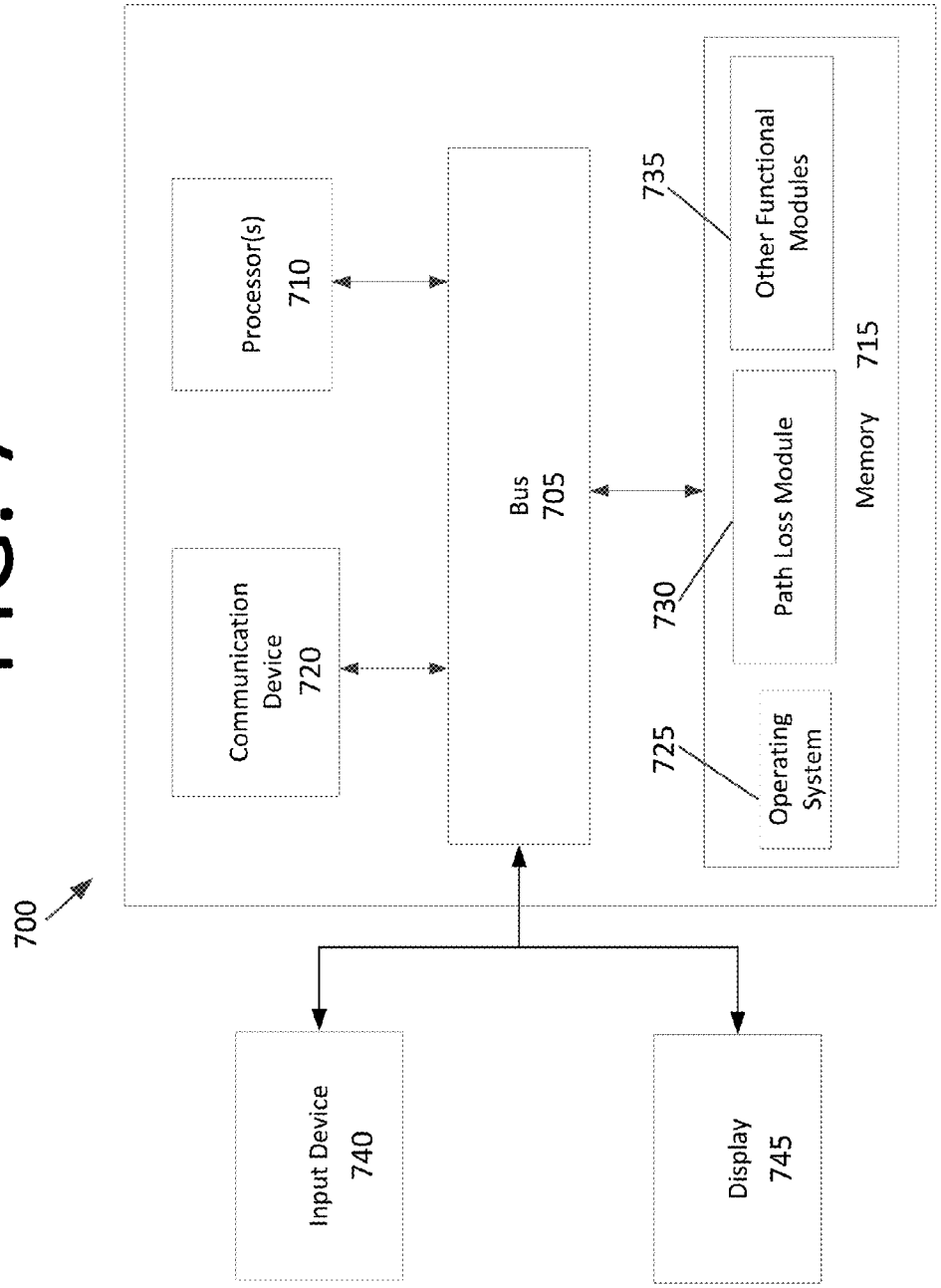
FIG. 7 is a block diagram illustrating a computing system for a UE, according to an embodiment of the present invention.

FIG. 7 is a block diagram illustrating a computing system 700 for a UE, according to an embodiment of the present invention. System 700 includes a bus 705 or other communication mechanism for communicating information, and processor(s) 710 coupled to bus 705 for processing information. Processor(s) 710 may be any type of general or specific purpose processor, including a central processing unit (CPU) or application specific integrated circuit (ASIC). System 700 further includes a memory 715 for storing information and instructions to be executed by processor(s) 710. Memory 715 can be comprised of any combination of random access memory ("RAM"), read only memory ("ROM"), flash memory, cache, static storage such as a magnetic or optical disk, or any other types of non-transitory computer-readable media or combinations thereof. Additionally, system 700 includes a communication device 720, such as a transceiver, to facilitate wired or wireless communication with external systems.

Non-transitory computer-readable media may be any available media that can be accessed by processor(s) 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 710 is further coupled via bus 705 to a display 745, such as a Liquid Crystal Display ("LCD"), for displaying information to a user. An input device 740, such as a touchscreen or a keyboard, is further coupled to bus 705 to enable a user to interface with system 700. Any type and combination of input devices may be used as a matter of design choice.

Memory 715 stores software modules that provide functionality when executed by processor(s) 710. The modules include an operating system 725 for system 700. The modules further include a propagation loss module 730 that is configured to determine propagation loss as discussed herein. System 700 may include one or more additional functional modules 735 that include additional functionality.

One skilled in the art will appreciate that a "system" could be embodied as a computer, a server, a console, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In certain embodiments, one or more UEs may be configured to measure path loss/isolation from protected stations, before activating their respective transmitters. The measured path loss/isolation may be transmitted to their respective BSs and/or NOC before transmission. This approach is significantly more efficient than monitoring strategies, e.g., a "wait and see" strategy. The "wait and see" strategy generally waits until interference is likely to occur, but this leaves insufficient time for wireless network real-location to avert violation of the "acceptable" level of aggregate interference from the one or more UEs. Furthermore, monitoring without UE in-situ path loss/isolation measurements forces the UE power allocation process to rely on highly inaccurate path loss/isolation predictions that result in less than full UE power allocations needed to maximize the opportunistic network capacity of the secondary network.

In some embodiments, when a beacon is placed within the Earth station, a receiver of the one or more UEs may receive a calibrated beacon signal from the Earth station, and subtract the received beacon signal power (stated in decibels) from a known calibrated beacon power (stated in decibels) to obtain a more accurate estimate of path loss/isolation than would be possible in the absence of such a UE configuration. The amount of interference that is received by the Earth station is the aggregate of power received from the one or more UEs in the region. Determination of the aggregate interference power requires the one or more BS or the NOC to monitor or poll the one or more UEs such that each UE reports the path loss/isolation for its particular interference path. This would normally occur before power is allocated to the one or more UEs to prevent violations of the "acceptable" level of aggregate interference being received by the Earth station or other protected radiocommunication station.

Stated differently, certain embodiments pertain to measurements performed by the one or more UEs of the path loss/isolation from the protected station that is available, allowing the NOC to allocate the power of the one or more UEs that contributes significant interference to the Earth station. This way, interference with the Earth station can be controlled and violations of the "acceptable" level of aggregate interference can be averted, while maximizing the opportunistic network capacity.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention. For example, the apparatus and the processes described herein can be applied to cellular networks and Earth stations having primary and secondary status reversed. A current example is a cluster of 3 Department of Defense (DoD) Earth stations at New Boston, N.H. transmitting in a band (1755-1780 MHz) shared with at least one cellular network, licensed via Auction 97, and protected under a to-be-determined aggregate interference power constraint.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process, comprising:
   estimating, by user equipment of a secondary wireless network, a path loss and isolation between the user equipment and a protected station of a primary wireless network prior to activating the user equipment in a shared band, wherein the protected station comprises an Earth Station with a downlink signal that is protected from interference from user equipment that causes radio frequency interference, wherein the estimating of the path loss and isolation is based on a power measurement of a calibrated beacon signal received by the user equipment from the protected station holding primary status, and wherein the calibrated beacon signal is periodically measured at the protected station and the measurement traced to national standards and wherein the signal is received from the protected station via a separate channel, the separate channel is separate from a frequency band transmitted by the user equipment and separate from the frequency band received by the protected station; and adjusting power, by the user equipment, to prevent violation of an acceptable level of aggregate interference with the protected station in the shared band, while maximizing an opportunistic network capacity of the secondary wireless network, wherein the aggregate interference is a sum of all user equipment-caused interference powers that are sharing a band or spectrum, the aggregate interference power is that which is received at the protected station, and is calculated at a network operation center based on the path loss received from the user equipment and other network power constraints.

2. The process of claim 1, wherein the calibrated beacon signal comprises a predefined and calibrated power signal of a beacon located at the protected station.

3. The process of claim 1, wherein the estimating of the path loss and isolation further comprises subtracting a measured power from a known value of a beacon transmit power.

4. The process of claim 3, wherein the estimating of the path loss and isolation further comprises adding predefined correction factors to account for dispersion errors.

5. The process of claim 3, wherein the measured power comprises a power of the received calibrated beacon signal.

6. The process of claim 1, further comprising:
   communicating, from the user equipment, the estimated path loss and isolation to a network operation center for calculating an allocation satisfying the aggregate interference power constraint, along with other constraints, wherein
   the allocation comprises a set of powers to be used by the user equipment.

7. The process of claim 6, further comprising:
   receiving, by the user equipment, the allocation from the network operation center.

8. The process of claim 1, further comprising:
   communicating, from the user equipment, the estimated path loss and isolation to a base station for calculating an allocation, wherein
   the allocation comprises a set of powers to be used by the user equipment.

9. The process of claim 8, further comprising:
   receiving, by the user equipment, the allocation from the base station.

10. The process of claim 1, wherein the calibrated beacon signal is received by a beacon receiver of the user equipment via the separate channel, the beacon receiver being separate from a standard receiver or transceiver on the user equipment.

11. The process of claim 1, wherein the estimating of the path loss and isolation between the user equipment and a protected station comprises measuring the path loss and isolation for all m user equipment, providing m degrees of freedom to an allocation space, the allocation space comprising all sets of powers to be used by the user equipment.

12. An apparatus, comprising:
at least one processor; and
memory comprising a set of instructions, wherein
the set of instructions with the at least one processor are configured to cause the apparatus to:
estimate a path loss and isolation between the apparatus and a protected station of a primary wireless network prior to activating the apparatus of a secondary wireless network in a shared band, wherein the protected station comprises an Earth Station with a downlink signal that is protected from interference from user equipment that causes radio frequency interference, wherein the estimation of the path loss and isolation is based on a power measurement of a calibrated beacon signal received by the user equipment from the protected station holding primary status, and wherein the calibrated beacon signal is periodically measured at the protected station and the measurement traced to national standards and wherein the signal is received from the protected station via a separate channel, the separate channel is separate from a frequency band transmitted by the user equipment and separate from the frequency band received by the protected station; and
adjust power to control aggregate interference with the protected station in the shared band, while maximizing an opportunistic network capacity of the secondary wireless network, wherein the aggregate interference is a sum of all user equipment-caused interference powers that are sharing a band or spectrum, the aggregate interference power is that which is received at the protected station, and is calculated at a network operation center based on the path loss received from the user equipment and other network power constraints.

13. The apparatus of claim 12, wherein the calibrated beacon signal comprises a predefined and calibrated power signal of a beacon located at the protected station.

14. The apparatus of claim 12, wherein the set of instructions with the at least one processor are configured to cause the apparatus to subtract a measured power from a known value of a beacon transmit power.

15. The apparatus of claim 14, wherein the set of instructions with the at least one processor are configured to cause the apparatus to add predefined correction factors to account for dispersion errors.

16. The apparatus of claim 14, wherein the measured power comprises a power value of the received calibrated beacon signal.

17. The apparatus of claim 12, wherein the set of instructions with the at least one processor are further configured to cause the apparatus to communicate the calculated path loss and isolation between the apparatus and the primary station to a network operation center for calculating an allocation the allocation comprises a set of powers to be used by the apparatus.

18. The apparatus of claim 1, wherein the set of instructions with the at least one processor are configured to cause the apparatus to receive the allocation from the network operation center via a base station.

19. The apparatus of claim 12, wherein the set of instructions with the at least one processor are configured to cause the apparatus to communicate the calculated path loss and isolation between the apparatus and the protected station to a base station for calculating an allocation, the allocation comprising a set of powers to be used by the apparatus.

20. The apparatus of claim 19, wherein the set of instructions with the at least one processor are configured to cause the apparatus to receive the allocation from the base station.

21. A process, comprising:
receiving, by a network operations center, an activity message of a protected station of a primary wireless network operating in a shared band with user equipment of a secondary wireless network;
allocating, by the network operations center, a set of powers for the user equipment based on the activity message of the protected station, wherein the protected station comprises an Earth Station with a downlink signal that is protected from interference from user equipment that causes radio frequency interference; and
communicating, by the network operations center, the allocated powers to the user equipment to control aggregate interference with the protected station in the shared band, while maximizing an opportunistic network capacity of the secondary wireless network, wherein the aggregate interference is a sum of all user equipment-caused interference powers that are sharing a band or spectrum, the aggregate interference power is that which is received at the protected station, and is calculated at a network operation center based on the path loss received from the user equipment and other network power constraints.

22. The process of claim 21, wherein the activity message of the protected station comprises an activity schedule of the protected station.

23. The process of claim 21, wherein the allocation of the power further comprises allocating the power for the user equipment to reduce a power of the user equipment to an acceptable level while the protected station is processing a signal received in the shared band.

24. A system, comprising:
a protected station of a primary wireless network configured to transmit a calibrated beacon signal to user equipment of a secondary wireless network, the protected station comprises an Earth Station with a downlink signal that is protected from interference from user equipment that causes radio frequency interference and the calibrated beacon signal is periodically measured at the protected station and the measurement traced to national standards and wherein the signal is received by the user equipment from the protected station via a separate channel, the separate channel is separate from a frequency band transmitted by the user equipment and separate from the frequency band received by the protected station, wherein
the user equipment is configured to
estimate the path loss and isolation between the user equipment and a protected station of the primary wireless network using a power measurement of the calibrated beacon signal, and
adjust power of the user equipment to control aggregate interference with the protected station in a shared band, while maximizing an opportunistic network capacity of the secondary wireless network, wherein the aggregate interference is a sum of all user equipment-caused interference powers that are sharing a band or spectrum, the aggregate interference power is that which is received at the protected station, and is calculated at a network operation center based on the path loss received from the user equipment and other network power constraints.

25. The system of claim 24, wherein the user equipment is further configured to transmit the estimated path loss and isolation between the user equipment and the protected station to a network operation center for use in calculating a power allocation for use by the user equipment.

26. The system of claim 25, wherein the network operation center is configured to calculate an aggregate received interference at the protected station.

27. The system of claim 26, wherein the network operation center is further configured to allocate power of the user equipment based on the estimated path loss and isolation between the user equipment and the station of a primary wireless network, calculated aggregate received interference, and at least one channel quality indication of the user equipment.

28. The system of claim 27, wherein the user equipment is further configured to receive the allocated power from the network operation center.

29. The system of claim 25, wherein the protected station comprises at least a beacon configured to generate the calibrated beacon signal.

30. The system of claim 24, wherein the user equipment is further configured to transmit the estimated path loss and isolation between the user equipment and the station of a primary wireless network to at least one base station for power allocation.

31. The system of claim 30, wherein the at least one base station is further configured to allocate power of the user equipment based on the estimated path loss and isolation between the user equipment and the station of a primary wireless network, calculated aggregate received interference, and at least one channel quality indication of the user equipment.

32. The system of claim 31, wherein the user equipment is further configured to receive the allocated power from the at least one base station.

* * * * *